United States Patent

Clusener

[15] 3,680,357

[45] Aug. 1, 1972

[54] DILATOMETER

[72] Inventor: Gerhard R. Clusener, Box 628, Pt. Washington, N.Y. 11050

[22] Filed: Sept. 21, 1970

[21] Appl. No.: 74,034

[52] U.S. Cl. .......................... 73/16, 336/30, 336/136
[51] Int. Cl. ............................................. G01n 25/16
[58] Field of Search ........... 73/16, 15.6; 336/30, 136; 33/147, 148

[56] References Cited

UNITED STATES PATENTS

| | | | |
|---|---|---|---|
| 1,489,115 | 4/1924 | Chevenard | 73/16 |
| 3,052,858 | 9/1962 | Darlington | 336/30 |
| 2,814,883 | 12/1957 | Strimel | 33/147 |
| 3,302,148 | 1/1967 | Nevius | 336/30 |
| 3,152,310 | 10/1964 | Schaevitz et al. | 336/30 |
| 3,368,393 | 2/1968 | Wilson et al. | 336/30 |
| 3,474,659 | 10/1969 | Levy et al. | 73/16 |

FOREIGN PATENTS OR APPLICATIONS 1,134,086   11/1968   Great Britain ................... 73/16

OTHER PUBLICATIONS

Bowles et al. " An Automatic Recording Dilatometer" in J. of Scientific Instruments Vol. 40, 1963, pg. 117–120

Primary Examiner—Richard C. Queisser
Assistant Examiner—Herbert Goldstein
Attorney—Leonard H. King

[57] ABSTRACT

Improved mounting means for the push rod and the linear variable differential transformer of a dilatometer are provided by individual, cantilevered spring means. A ball anvil provides coupling means between the transformer and a micrometer that is used for calibration and zeroing purposes. The core of the transformer, the push rod and the material under test are mounted in tandem.

14 Claims, 9 Drawing Figures

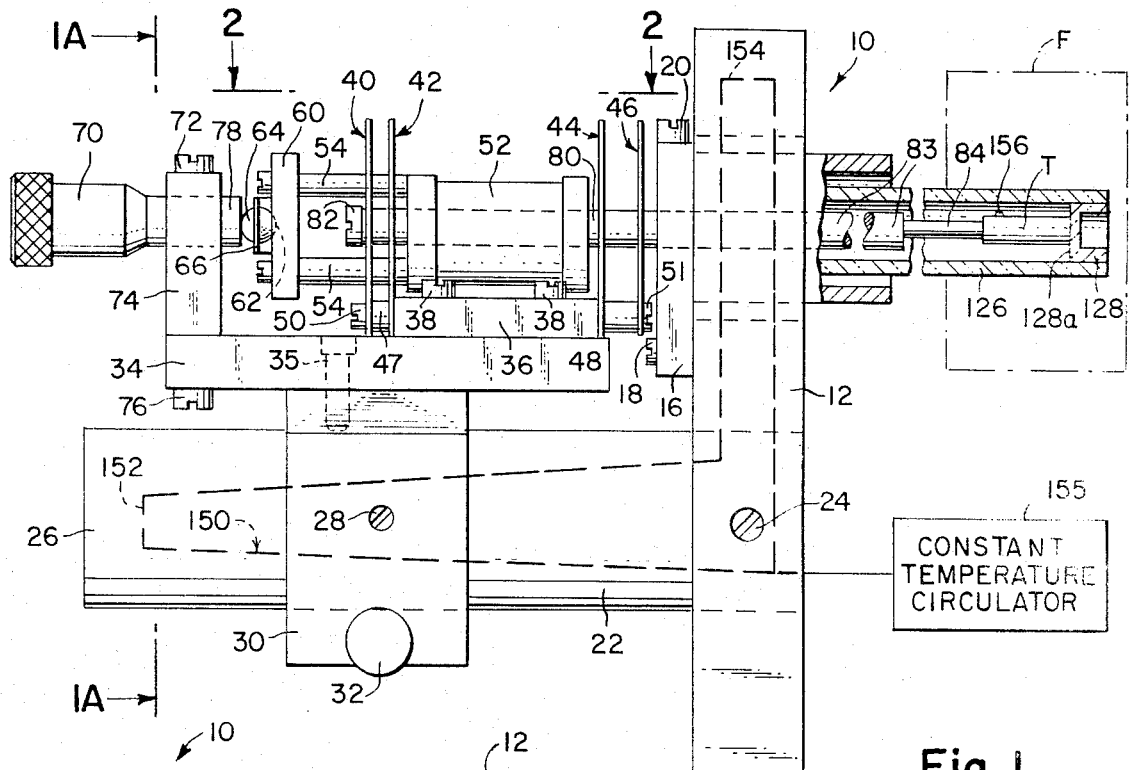
Fig. 1
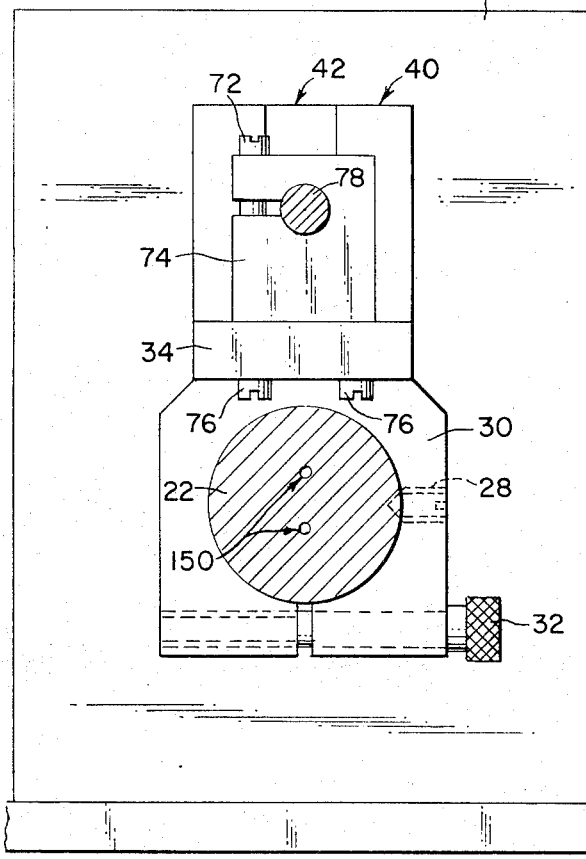
Fig. 1A
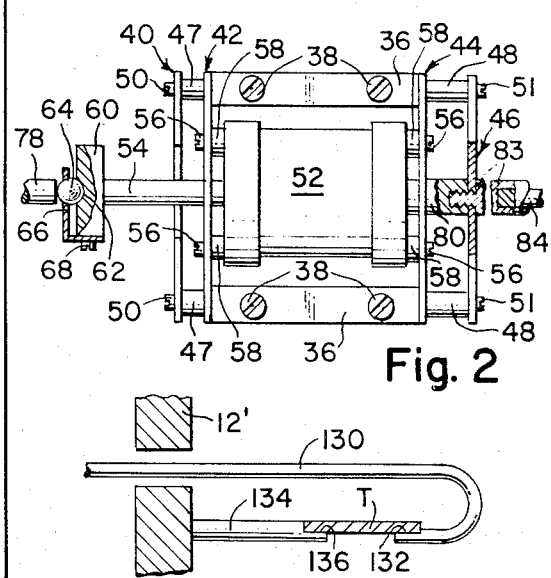
Fig. 2
Fig. 4
INVENTOR.
Gerhard R. Clusener
ATTORNEY

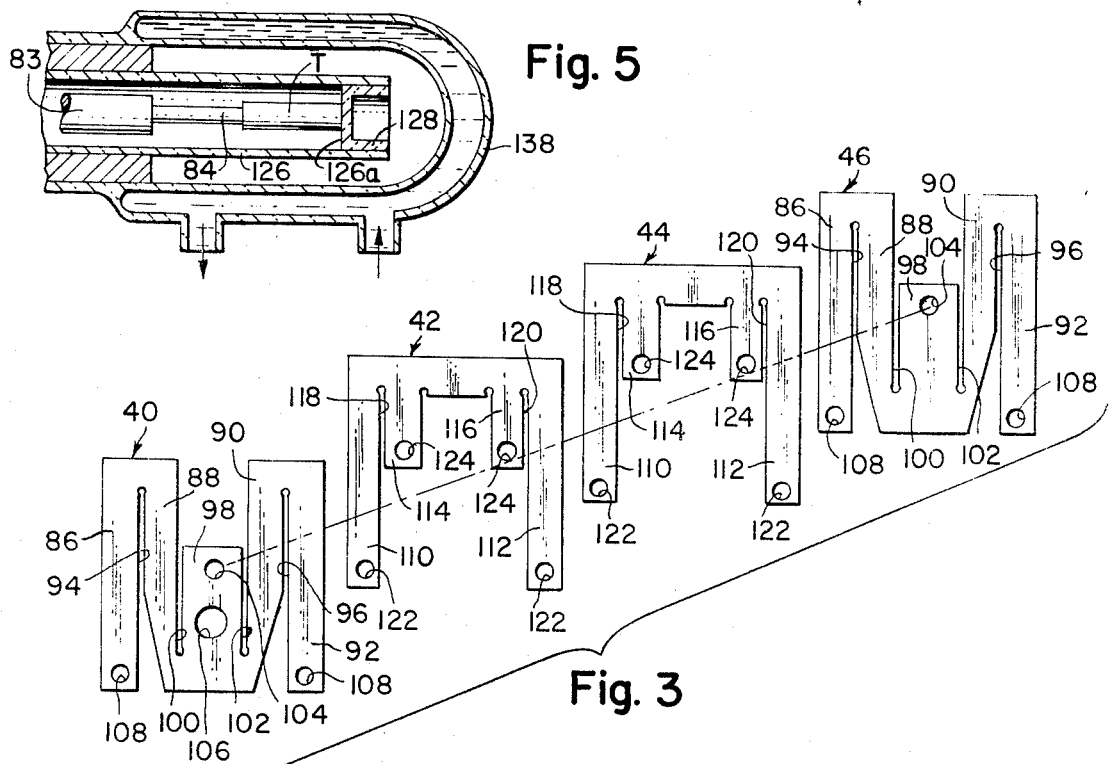
Fig. 5
Fig. 3
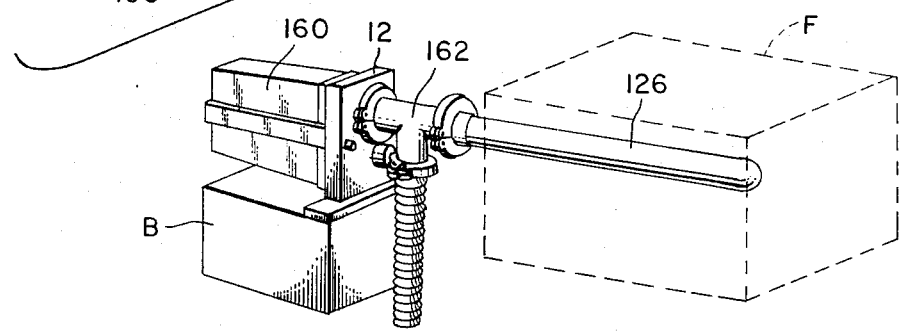
Fig. 6
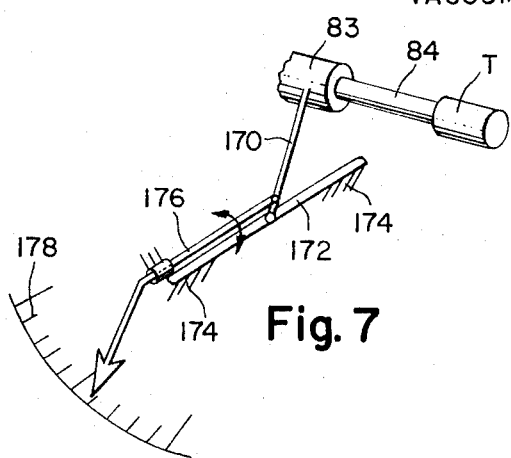
Fig. 7
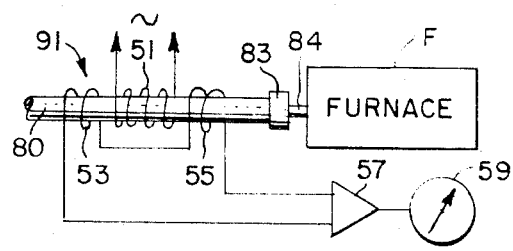
Fig. 8
INVENTOR.
Gerhard R. Clusener
BY
Leonard H. King
ATTORNEY

DILATOMETER

This invention relates generally to measuring instruments and, more particularly, to a dilatometer and improved mounting means for the components thereof.

BACKGROUND OF THE INVENTION

Dilatometers are used for measuring the linear thermal expansion of solids. They are used for determining both the coefficient of linear, thermal expansion, as well as to detect phase transitions in material for analytical purposes.

Some applications of the dilatometer include the measurement of change in the crystallographic structure of materials. That is, the transition point and softening point in plastics, or the continuous cooling curve transformation in steel through rapid quenching.

Another application of a dilatometer is a study of the compatibility of materials under changing temperature conditions, for example, metal to glass, enamel to substrates, thin film depositions on micro-circuits or matching tooth fillings with natural teeth material. A dilatometer may also be used for process simulation such as firing of ceramics, heat treating of metals (annealing and quenching) sintering of powders and composite materials and measurement of minerals.

The common dilatometer consists mainly of three major sections which include a furnace with a temperature control, the actual dilatometer with a measuring unit and suitable recording equipment. There are many examples of commercial furnaces and programmers as well as recorders. However, there are only a very limited number of dilatometer measuring units. A widely used dilatometer has a ball bearing push rod support. This construction has the disadvantage of moving freely only under ideal conditions. Dust, dried out oil and improper adjustment make the proper functioning of the instrument questionable and hence the output of the device unreliable.

The present invention overcomes the shortcomings of the prior art and is particularly advantageous where only a limited space is available, such as vacuum chambers, hot cells, etc. As will be made evident hereinafter, the present invention is compact and self-contained to thereby minimize temperature and differential effects. A ball anvil couples a linear, variable, differential transformer that is adjustable and a micrometer that is used for calibration and zeroing purposes. Interleaved rather than serially arranged cantilevered spring means individually support the transformer and a push rod that is in engagement with the work piece to be tested. The work piece is in turn supported in a fused quartz tube that is adapted to be positioned within a furnace. When the furnace is brought up to temperature, the expansion of the test sample is transferred through the push rod into the measuring head. The differential transformer changes the variation in the length of the sample into an electrical signal. A demodulator conditions the signal for suitable recorder display.

Accordingly, it is the primary object of the present invention to provide an improved instrument for measuring the thermal properties of materials.

Another important object of the present invention is to minimize the friction during measurement of length changes of the material under test.

A particular feature of this invention is that the push rod and liner linear variable differential transformer are individually mounted on interleaved, separate, cantilevered spring members.

An advantage of this invention is that the micrometer used for calibration and zeroing purposes is coupled to the linear variable differential transformer by means of a ball anvil contact member.

Another feature of this invention is that compact support means are provided for the transformer and the push rod.

These and other features, objects and advantages of the invention will, in part, be pointed out with particularity, and will, in part, become obvious from the following more detailed description of the invention, taken in conjunction with the accompanying drawing, which forms an integral part thereof.

In the various figures of the drawing, like reference characters designate like parts.

IN THE DRAWING

FIG. 1 is a side elevational view of the present invention partially broken away, partially in section and partially schematic; and FIG. 1A is an end elevational view thereof;

FIG. 2 is a plan view taken along line 2—2 of FIG. 1 with a portion broken away for clarity;

FIG. 3 is an exploded perspective view illustrating the relationship of the cantilevered spring support means for the push rod and the linear variable differential transformer comprising the present invention;

FIG. 4 is a schematic view illustrating an alternative mounting arrangement for the sample under test;

FIG. 5 is another schematic view illustrating still another alternative mounting arrangement for the sample under test;

FIG. 6 is a perspective view illustrating one application of the present invention;

FIG. 7 is a schematic view illustrating another application of this invention; and FIG. 8 is a schematic diagram illustrating the linear variable differential transformer.

Referring to the drawing and in particular to FIG. 1 and FIG. 2, there is shown one embodiment 10 of the present invention. There is provided a pedestal 12 having a mounting base 14 and a clamp ring 16 which is secured to the pedestal by means of screws 18. The clamp ring 16 is split and includes a screw 20 that is used for clamping purposes. An Invar post 22, having a low coefficient of expansion, is secured to the upright pedestal 12 by means of a set screw 24. The Invar post 22 has a longitudinal keyway 26 formed on the surface thereof so as to mate with a guide screw 28 that is located in a support carriage 30. A screw 32 is used to clamp the carriage 30 to the post 22. A mounting plate 34 is suitably secured to the top of the carriage 30 by means of screws 35.

Mounted on the plate 34 are a pair of longitudinally extending and laterally spaced blocks 36 that are secured thereto by means of screws 38. Spring means 40, 42 and 44, 46 are mounted on the ends of the blocks 36 by means of spacers 47, 48 and screws 50, 51, respectively. The spring means 40, 42, 44 and 46 are interleaved and mounted in a cantilevered arrangement that will be described structurally in greater detail in connection with FIG. 3.

There is provided a linear, variable, differential transformer 52 having upper and lower support members 54 extending axially from one end thereof through the springs 40, 42, as shown in FIGS. 1 and 2. The body of the transformer 52, which is hollow, is secured to the spring means 42 and 44 by means of screws 56 and spacers 58. The outer end of the posts 54 terminate in a block 60 having a seat 62 for receiving a ball anvil 64. A retainer 66 is secured to the block 60 by means of a screw 68 in order to retain the ball anvil 64. A micrometer 70 is clamped by means of a screw 72 to a post 74 that is mounted on one end of the plate 34 by means of a screw 76. The anvil 78 of the micrometer 70 is in tangential contact with the ball anvil 64 which is coaxial with the body of the transformer 52. The combination of the ball anvil 64 bearing tangentially against the micrometer anvil 78 provides for extremely precise adjustment using a conventional gauge block.

The spring means 40 and 46 serve to mount the core 80 of the transformer 52. A screw 82 secures the left hand end (FIG. 1) of the core 80 to the spring means 40. The right hand end of the core 80 is internally threaded in order to receive a holder 83 which has a bore into which is secured a high temperature resistant push rod 84. The rod is preferably formed of sintered alumina or fused silica. When the push rod 84 is threaded into the core 80 it clamps the spring means 46 therebetween.

From the foregoing it will be evident that the core/push rod 80/84 and the transformer body 52 are mounted independently of each other by means of pairs of cantilevered springs 40/46, 42/44, respectively.

The construction of the springs 40, 42, 44 and 46 is shown best in the exploded view of FIG. 3. All other structure has been eliminated for purposes of clarity. Turning first to the spring means 40 and 46, it will be seen that they are comprised of outboard, bifurcated legs 86, 88 and 90, 92, having slots 94 and 96, respectively, therein. A central portion 98 is spaced from the legs 88 and 90 by means of slots 100 and 102, respectively. The central portion 98 is provided with a relatively large hole 106. The construction of spring member 46 is the same as spring member 40 except for the absence of the relatively large hole 106. Mounting holes 108 are provided at the lower most ends of legs 86 and 92. Screws 50 and 51 utilize the mounting holes 108 in order to secure the spring means 40 and 46 to the plate 36. The lower support member 54 passes loosely through the hole 106 while the supper support member 54 passes between the legs 88 and 90 directly above the central section 98. The screw 82 passes through the small hole 104 in order to secure the core 80 to the spring means 40.

The spring means 42 and 44 are identical and are comprised of outboard legs 110, 112 and inboard legs 114, 116. The inboard and outboard legs are separated by slots 118 and 120. The lower end of the outboard legs 110 and 112 are provided with apertures 122 while the lower end of the relatively short inboard legs 114 and 116 are provided with apertures 124. Screws 50 and 51 pass through the apertures 122 in order to secure the spring means 42 and 44 to the plate 36 while the screws 56 pass through the apertures 124 in order to secure the transformer body to the spring means 42 and 44.

Once again it should be noted that both the core 80 (and therefore the push rod 84) as well as the transformer body 52 are mounted independently of each other by means of separate pairs of cantilevered spring means. By interleaving the springs as shown, that is, using adjacent spring members to support one end of the core and the transformer body, a very compact structure is provided.

One means for mounting the test sample T is shown in FIG. 1. A fused quartz sleeve 126 is coaxially positioned about the free end of the push rod 84. The sleeve 126 has a plug 128 at its right hand end, the inner surface 128a of the plug 128 being ground square and perpendicular to the axis of the push rod 84. The test sample T is positioned between the plug surface 128a and the end of the push rod 84, the entire assembly being positioned within a furnace F.

Alternative structure for mounting the test sample T is shown in FIG. 4. Therein it will be seen that the push rod 130 has a squarely ground seat 132 formed on the free end thereof. A member 134, extending outwardly from the pedestal 12', which in this embodiment may be water cooled, is similarly provided with a squarely ground seat 136 so that the test sample T may be supported on the confronting seats 132 and 136.

For low temperature applications, the construction shown in FIG. 5 is preferred. A jacket 138 for circulating a cooling fluid is positioned about the sleeve 126, the push rod 84 and the test sample T located therebetween.

Another feature of the present invention will be appreciated by reference once again to FIGS. 1 and 1A. A fluid passageway schematically illustrated by the broken line 150 is utilized to carry relatively large mass of a circulating liquid 155 maintained at a constant temperature above normal room temperature which stabilizes the temperature and hence the expansion of the Invar post 22. In practice a temperature of 40° C was found to be effective. In this connection it should be noted that the passageway 150 is shown schematically and sections 152 and 154 thereof are actually in horizontal planes that run perpendicular to the axis of the push rod 84. The temperature controlled heating equipment is state-of-the-art and may be located in base B.

As shown in FIG. 1, a thermocouple 156 is suitably mounted on the test sample T. A second thermocouple (not shown) that is electrically connected to the thermocouple 156 in a conventional manner uses the temperature stabilized Invar post 22 as a reference junction avoiding the need for expensive electronic compensators or ice bath reference devices.

Referring now to FIG. 6, there is shown one application of the present invention. Using the structure shown in FIG. 1, a housing 160 is used to seal and enclose all of the components to the left of the pedestal 12. A T-shaped member 162 is positioned intermediate the sleeve 126 and the pedestal 12 by means of suitable O-rings and clamps, the T-shaped member 162 being adapted to be coupled to a source of vacuum. When the interior of the entire unit is substantially evacuated, the inaccuracies from air convection currents will be avoided.

Where it is useful to carry out the temperature expansion determinations under a specific force loading on the specimen, then the indicator shown in FIG. 7 is employed. One end of an arm 170 is placed in contact with push rod holder 83 which engages the test sample T through push rod 84 while the other end of the arm 170 is suitably secured to a taut torsion member 172 which may be wire or a taut band representing a force standard. Conventional means 174 support the opposed ends of the torsion member 172. A second arm 176 is coupled to the torsion member 172, for example by means of a suitable adhesive, and is angularly responsive to the position thereof that results from putting the transducer under tension by moving support carriage 30. A suitably calibrated scale 178 is placed adjacent the free end of the second arm 176 to provide an indication of the magnitude of force thereof.

There is shown in FIG. 8 a schematic diagram of the linear variable differential transformer 91.

As the push rod 84 moves the core 80 in and out the of the transformer, an unbalance condition is generated in a bridge to which the windings are connected. This bridge arrangement is conventional in the art and is not shown. The bridge output is then usually fed to a recorder or other form of indicator.

The transformer body 52 has a primary winding 51 and the two secondary windings 53 and 55, these secondary windings being connected together in series. The core 80 may be shifted so that the voltage induced in the coils 53 and 55 may each be equal and out of phase so as to produce a zero output, at which condition, the core is in the null position. Shifting the core 80 will increase and decrease the output voltage from the secondaries in accordance with the direction of the shifting of the core. The output is fed to an amplifier 57 and a readout device 59. This is the construction and operation of the well known and commercially obtainable linear variable differential transformer. The micrometer provides a coarse adjustment which enables zeroing the indicator 59. A precision gage block is then inserted between the ball 64 and spindle 78 and the gain of the amplifier 57 adjusted for the desired scale deflection. The term "indicator" as used herein is intended to encompass such devices of digital voltameters, potentiometric recorders, etc.

In summary, it should be noted that the apparatus is intended to measure the expansion of a specimen when heated under a predetermined measuring force. The accurate measurement mandates that the apparatus itself not change dimensionally under external influences during the test. The apparatus of this invention accomplishes this by utilizing temperature controlled low coefficient of expansion mountings and by employing a compact construction. In this construction, the transformer is supported on one set of springs while the push rod assembly is supported on a second set of springs interleafed between the first set. Means are also provided to run the test under vacuum eliminating air convection currents which in turn might heat the transducer section.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. A dilatometer for measuring the thermal properties of a test sample, said dilatometer comprising:
    a. a linear variable differential transformer;
    b. a core freely floating in said linear variable differential transformer;
    c. a tandemly positioned push rod secured at a first end to said core, the second end of said push rod being adapted to abut the sample under test;
    d. first cantilevered spring means for supporting said linear variable, differential transformer, said first cantilevered spring means comprising a pair of leaves, each said leaf including first and second pairs of legs, said second pair of legs being rigidly secured to said linear variable, differential transformer, said leaves of said first cantilevered spring means being positioned at opposite ends of said linear variable differential transformer;
    e. second cantilevered spring means for supporting said core and said push rod independently of said linear variable, differential transformer, said second cantilevered spring means comprising a pair of leaves, each said leaf including a first and second pair of legs, said second pair of legs being secured to said push rod;
    f. means for mounting said first and said second cantilevered spring means, said first pair of legs of each said leaf of said first and said second cantilevered spring means being rigidly secured to said mounting means; and
    g. calibrating means coupled to a portion of said linear variable, differential transformer.

2. The dilatometer in accordance with claim 1 wherein said mounting means comprises a plate, a carriage secured to said plate, a post mounted in said carriage and a pedestal supporting said post.

3. The dilatometer in accordance with claim 2 further including means for adjusting the position of said plate on said post so as to vary the force applied to the test sample.

4. The dilatometer in accordance with claim 2 wherein said post is a metal having a low coefficient of expansion.

5. The dilatometer in accordance with claim 4 further including a passageway in said post for a circulating fluid.

6. The dilatometer in accordance with claim 1 wherein said first pair of legs are bifurcated, one portion of said bifurcated legs being secured to said mounting means, the other portion of said bifurcated legs being integral with said respective second legs.

7. The dilatometer in accordance with claim 1 wherein one end of said core is rigidly secured to one of said second legs, the other of said second legs being captured between said second end of said core and the confronting end of said push rod.

8. The dilatometer in accordance with claim 1 wherein said push rod is U-shaped, said second end of said push rod including a first seat for the sample under test, there being further included a cooperating second seat for the sample under test, said second seat being fixed relative to said first seat.

9. The dilatometer in accordance with claim 1 wherein the portion of said push rod in abutment with the sample under test is surrounded by a support sleeve.

10. The dilatometer in accordance with claim 9 wherein said sleeve is further surrounded by a hollow body containing a cooling medium.

11. The dilatometer in accordance with claim 1 wherein said calibrating means is a micrometer.

12. The dilatometer in accordance with claim 11 further including a ball anvil interposed between the free end of the anvil of said micrometer and the said portion of said linear variable differential transformer.

13. The dilatometer in accordance with claim 1 further including a housing enclosing all the structure thereof except the portion of said push rod that is in abutment with the sample and means for coupling said housing to a source of vacuum.

14. The dilatometer in accordance with claim 1 further including torsion means, coupling means extending between the sample under test and said torsion means whereby a force applied to the test sample causes a twisting of said torsion means and means responsive to the twisting of said torsion means for visually indicating the force applied to the test sample.

* * * * *